United States Patent [19]

Bettencourt et al.

[11] 4,365,463
[45] Dec. 28, 1982

[54] HARVESTING TOMATOES

[75] Inventors: Thomas S. Bettencourt, Isleton; Daniel L. Freeman, Rio Vista, both of Calif.

[73] Assignee: The Regents of The University of California, Berkeley, Calif.

[21] Appl. No.: 223,162

[22] Filed: Jan. 7, 1981

[51] Int. Cl.³ .................... A01D 45/00; A01D 89/00
[52] U.S. Cl. .................................. 56/327 R; 56/364
[58] Field of Search ................ 56/327 R; 171/14; 56/364, 1

[56] References Cited

U.S. PATENT DOCUMENTS

| 2,835,098 | 5/1958 | Scheidenhlem | 56/327 R |
| 3,078,926 | 2/1963 | Ries et al. | 56/327 R |
| 3,236,038 | 2/1966 | Gates et al. | 56/364 |
| 3,416,298 | 12/1968 | Erdman | 56/329 R |
| 3,514,928 | 6/1970 | Kenyon et al. | 56/327 R |
| 3,821,987 | 7/1974 | Shepardson et al. | 56/327 R |
| 3,921,375 | 11/1975 | Cetrulo, Jr. | 56/327 R |
| 3,986,324 | 10/1976 | Harriott et al. | 56/327 R |
| 3,986,561 | 10/1976 | Bettencourt et al. | 56/327 R |
| 3,990,217 | 11/1976 | Aoyama | 56/1 |
| 4,099,364 | 7/1972 | Kaniengieter et al. | 56/1 |
| 4,147,017 | 4/1979 | Cortopassi et al. | 56/327 R |
| 4,189,906 | 2/1980 | Cooper | 56/327 R |
| 4,234,045 | 11/1980 | Porter | 171/14 |

FOREIGN PATENT DOCUMENTS

| 956799 | 10/1974 | Canada | 56/364 |
| 1147157 | 11/1957 | France | 56/364 |
| 2310076 | 12/1976 | France | 56/327 R |

Primary Examiner—Paul J. Hirsch
Attorney, Agent, or Firm—Owen, Wickersham & Erickson

[57] ABSTRACT

A tomato harvester pickup and harvesting method. A pickup conveyor with a relatively flat pickup angle is combined with an overhead assist system. An assist frame pivotally secured to the pickup frame above and spaced from the forward end of the conveyor pivotally supports, with spring return, the front end of a plurality of generally horizontal guideways forward of and above the forward end of the pickup conveyor. The rear end of each guideway is steeply upwardly and rearwardly inclined but forward of the pickup conveyor. A corresponding plurality of powered endless overhead assist chains are supported by the front and rear ends of the assist frame and the guideways for movement in a path extending horizontally rearwardly along the guideways, then up steeply with increasing spacing from the pickup conveyor to the rear end, and then downwardly and forwardly to the front end. From each chain a series of flexible projections extend out substantially normally. When the assist chain moves along its guideway, some projections extend down into tomato vines and engage them, and then they carry the vines upwardly steeply along the steeply inclined portion of the loop. A series of vine releasing tines extend downwardly and then rearwardly and act to free the cut vines from the assist chains when the vines lie over the pickup conveyor, thereby insuring transfer of the vines fully to the pickup conveyor.

38 Claims, 8 Drawing Figures

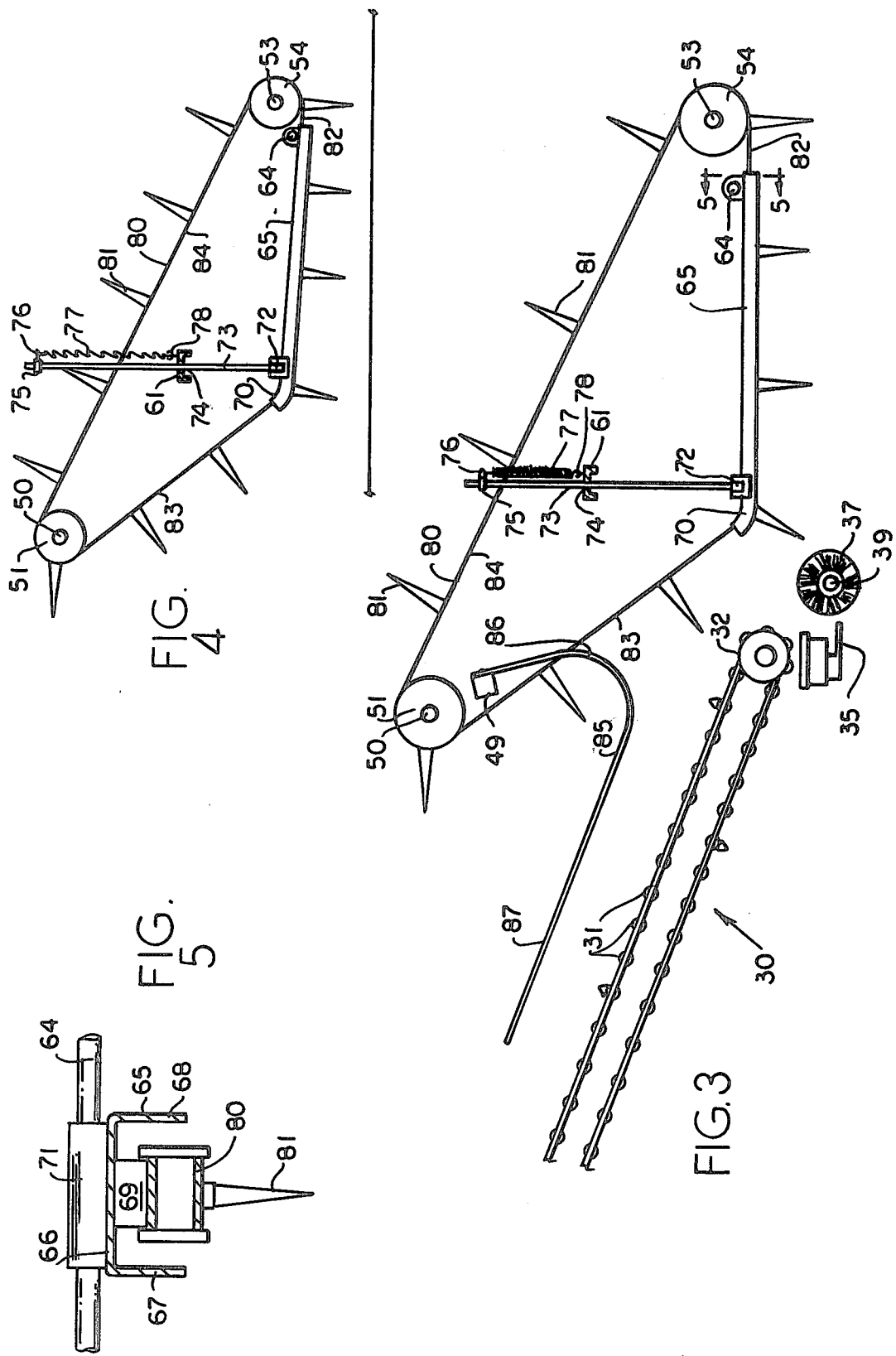

HARVESTING TOMATOES

This invention relates to the harvesting of tomatoes and has both method and apparatus aspects.

BACKGROUND OF THE INVENTION

In general there are two types of tomato crops grown, those which are grown for canning, and those which are grown for the fresh market. Canning tomatoes have long been mechanically harvested, while fresh market tomatoes have only rarely been mechanically harvested.

The present invention originated due to some peculiarities in the way tomatoes are grown in some parts of Florida. After the method and apparatus had been found to operate successfully there, they were modified somewhat for application to other growing areas and found to give improved results in many instances.

The system used in some parts of Florida is unique, and to many people it will appear nearly as fantastic as a science fiction story. The tomatoes are grown, not in soil, but in rock which has been broken up, and the growing process has many other unusual aspects. The present inventors do not claim to have invented the novel features of growing tomatoes in this manner, but restrict their claims to the harvesting of the crop. Since the way in which the tomatoes are grown gives rise to several problems that affect harvesting; an explanation of that growing method will be helpful.

In the parts of Florida where this unique method is practiced, there are old coral beds lying only a few feet above sea level with very little, if any, soil on top of them. The coral beds are broken up to a depth of about one foot or more to form a generally flat field. The field is then provided with raised beds located six feet on center, each bed being separated from its adjacent beds by a furrow about one foot deep. The furrows and beds all lie along a north-south axis. At intervals, some beds are omitted and replaced by a wide strip to be left uncultivated and provided with wells drilled at suitable uncultivated and provided with wells drilled at suitable intervals. These wells may extend down about twenty feet with the water table very high in these locations, only about four feet below the surface, and they are made only large enough for insertion of suitable pumping conduits. These wells are used for watering the tomatoes.

The next step before planting is to fertilize the field by injecting fertilizing liquid or gas into the beds. Immediately thereafter, plastic strips are laid over each bed and are simultaneously perforated by a roller carrying a series of perforated spikes. Next, larger holes are burned through the plastic at regular intervals, and a plug containing one or more seeds is inserted in each hole. The field is then watered, the seeds germinate, and the plants come up.

Both before and after germination the beds are watered overhead by large rotating jets of water that are sprayed from a truck or other suitable conveyance which moves from south to north along a well strip, in the direction of the prevailing winds. The truck moves from well to well, drawing out water and spraying it over the field.

When the plant is about eight inches tall, workers remove the lower shoots, which they term "suckers", leaving only two opposite laterals near the top of each small plant. It has been found that this early treatment increases the amount of fruit relative to the amount of leaves on the plant and produces a much larger harvestable crop than would otherwise be obtained. As, the plant then continues to grow, it tends to sprawl due to its early treatment. During this second growth period, further fertilizer may be injected from time to time from the sides of the bed along the furrows.

When it comes time to harvest the tomato crop the ripe tomatoes may be pulled off by hand, but mechanical harvesting can save considerable tedious and expensive labor.

In the past, mechanical harvesting has been difficult, partly because the plants are so sprawled that it is difficult to sever the stems properly. The powered sickles long used to cut off tomato plants grown for canning, are unsatisfactory for they simply glide over a large proportion of the plants and fail to harvest the ones they glide over. As a result, many plants have tended to the trampled under the mechanical harvester and much of the crop lost. Other types of cutters gave no significant improvement. Moreover, the plastic sheet tended to catch in them and also to get in the way of harvesting. Harvesters that dug into the soil and brought up a thin layer of soil were worse than useless in the broken-rock fields.

The present invention relates largely to apparatus and method which can harvest such crops efficiently, by operating over the plastic and cutting and picking up every plant. The invention, summarized below and then described in detail, involves stretching the stem of the plant upwardly and then severing it easily, while substantially simultaneously picking up the severed portion and then depositing it on an upwardly moving pickup conveyor.

Once the apparatus and method of this invention had been perfected for use in those unusual Florida conditions, it was found to offer some advantages over more common types of tomato harvesting as practiced heretofore, so that it was decided to try it out in still other environments.

For fresh market tomatoes in areas where there is good soil and where the novel Florida method is not used, the apparatus and certain aspects of the method have been found to be valuable in two quite different types of harvesting systems. In one, the stems of the tomato plants are cut two or three hours before the plants are to be picked up. This method can also be used in the Florida system and elsewhere, if desired. This pre-cutting affects the tenacity of attachment of the fruit and also toughens the skins, so that upon later shaking the stems tend rather uniformly to break off right at the tomato rather than at a location an inch or two from the tomato. Stems broken at a point away from the tomato, leave stiff sharp portions attached to the fruit that tend to damage other adjacent tomatoes. Stems broken off right at the tomato, minimize amount of such damage. The two or three hour delay between cutting and shaking not only increases this desirable tendency but also tends to make the tomato skins somewhat more resistant to damage.

After the precutting, the present invention makes it easier to pick up the tomato vines mechanically and deposit them on the pickup conveyor as it moves through the field. The improvement is obtained by the invention's use of an overhead assist that helps lift the severed plants and drop them onto the conveyor.

The method and apparatus of this invention also have advantages when using the normal type of powered sickle in normal fields of tomatoes, to cut off the plant at the time that it is harvested. Since there is a lifting of the plant from above, both at the time of severance and shortly before and after it, much less dirt is taken up by the pickup, so that in fields where dirt tends to be a problem the tomatoes can be harvested much more cleanly than heretofore. Particularly for canning tomatoes this has a great advantage, since large bins or trailer loads of canning tomatoes have often been rejected, a whole bin or trailer load at a time, due to the presence of too much dirt. When the tomatoes are harvested according to the present invention, a maximum yield can be obtained while a minimum amount of dirt is picked up.

Thus, the invention has among its objects the solution of several significant problems. One object of the invention is to enable the improved mechanical harvesting of fresh market tomatoes.

Another object of the invention is to enable the mechanical harvesting of fresh market tomatoes grown in broken-rock fields in beds which have been covered by plastic sheets.

Another object is to obtain efficient severing and treating of tomato plants during the difficult harvesting conditions obtaining when tomatoes are grown in rock-fields with their roots under plastic.

Another object of the invention is to provide an overhead assist system which reduces the amount of dirt picked up in fields where there is dirt and thereby enables the harvesting of a maximum amount of clean tomatoes, whether they are canning tomatoes or fresh market tomatoes.

Another object of the invention is to provide for harvesting of fresh market tomatoes by a system in which the vines are pre-cut near ground level and are then lifted onto the tomato harvester, again with a minimum amount of dirt being picked up.

Other objects and advantages of the invention will appear from the following description of some preferred embodiments thereof.

SUMMARY OF THE INVENTION

A tomato harvester pickup of this invention comprises a pickup frame pivotally secured to the main frame of the harvester. A pickup conveyor supported by the pickup frame has a relatively flat pickup angle at its forward end.

An overhead assist frame is pivotally secured to the pickup frame above and spaced from the forward end of the pickup conveyor. A plurality of generally horizontal guideways are pivotally supported by the front end of the assist frame at a location forward of and above the forward end of the pickup conveyor. Each guideway has a steeply upwardly and rearwardly inclined rear portion, beginning slightly forward of the forward end of the pickup conveyor. A corresponding plurality of powered endless overhead assist means, such as endless chains, are supported by the front and rear ends of the assist frame, and each one passes along the lower surface of one guideway, for movement in a continuous loop path extending horizontally rearwardly along the guideways, then up steeply with increasing vertical spacing above the pickup conveyor to the rear end of the assist frame, and then downwardly and forwardly to the front end. The assist means move somewhat faster than the harvester's ground speed.

A series of flexible projections, such as rubber fingers, extend out substantially normally from each assist means, so that when the assist means moves along its guideway, the projections extend down into the tomato vines and engage them; then the projections carry the vines upwardly steeply along the steeply inclined portion of the loop. A series of vine releasing means, such as shaped tines, are secured to the rear end of the assist frame and extend downwardly and then rearwardly for freeing the vines from the assist means at a location where the vines are over the pickup conveyor, thereby insuring transfer of the vines fully to the pickup conveyor.

For market tomatoes, as grown in some parts of Florida by using a plastic cover over the ground or broken rock, there is preferably a sickle-type stem-cutter supported transversely by the pickup frame at and below its forward end. A pair of power-driven rotary cylindrical brushes supported transversely by the pickup frame, one one each side of and forward of the stem cutter, help to center the tomato plant relative to the stem-cutter.

Moreover, there is a ground-engaging roller supported rotatably by and beneath the pickup frame transversely of the frame and spaced rearwardly from the forward end. This roller helps to hold the plastic cover down.

When the tomato vines are grown in a raised bed between a pair of furrows, a pair of gauge wheels are supported by the assist frame and ride in the two furrows, one one each side of the raised bed.

Preferably the plurality of lower horizontal guideways are pivoted to said front end of the assist frame and extend toward the rear therefrom. Separate spring-loaded means for each guideway are connected to an intermediate transverse frame portion, so that the rear portion of the guideway and the assist means therein can be lifted upwardly by a tomato plant, but only against the force of the spring, which tends to restore the guideway and the assist means therein to a position parallel to the ground.

One method of the invention comprises severing the stems of each growing tomato vine for harvest at or near ground level, and then two or three hours after the severing, engaging the tomato vines from above and depositing them on the lower end of a forwardly moving harvester pickup. From thence they are elevated and transferred to a station where the tomatoes are separated from the vines.

As stated, the invention provides a method for growing and harvesting tomatoes in rocky terrain where the rock has been broken up. The tomato plants are grown on raised beds, each bed lying between a pair of furrows and being covered by perforated plastic sheets with the tomato plants located at openings through the plastic sheets. When the tomato plants are approximately 8 inches tall, the lower side stems and leaves are removed, allowing only a pair of upper laterals to remain.

When the plants are ready for harvest, they are harvested over the plastic sheet, while holding the plastic sheet down. The harvesting is done by engaging each plant from above and, while centering it in front of a severing apparatus, lifting it up and stretching it, and then severing the stem above but near the upper surface of the plastic sheet. Then immediately following the severing, a pickup is moved beneath the lifted plant, and the plant is transferred to the pickup for sole support thereby. After that the plant is elevated and transferred to a separation station where the fruit is removed from the remainder of the plant.

BRIEF DESCRIPTION OF THE DRAWINGS

FIG. 3 is a somewhat diagrammatic view in side elevation showing the relation between the overhead assist apparatus and the pickup device, including both the severing sickle blade and the pickup apparatus.

FIG. 4 is a reduced view of the assist apparatus of FIG. 3 with the lower, horizontal view of an assist chain pushed upwardly under spring tension.

FIG. 5 is a greatly enlarged view in section taken along the line 5—5 in FIG. 3 showing the relationship of the assist chain to its guideway.

SOME PREFERRED EMBODIMENTS OF THE INVENTION

A harvester for use in broken coral fields, as in Florida (FIGS. 1-4).

Figure 6:
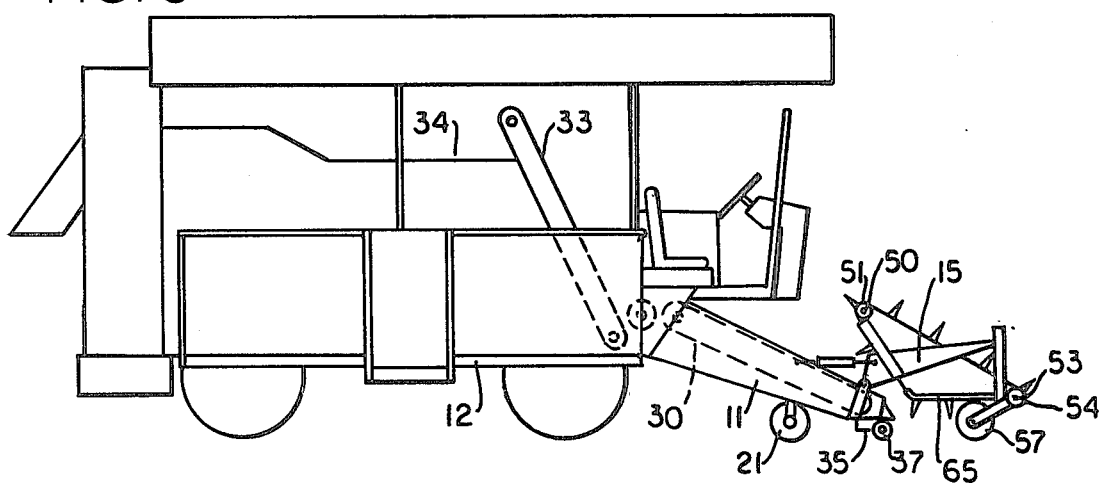
FIG. 6 is a simplified view in side elevation of a complete tomato harvester embodying the principles of the invention and the structure of FIG. 1-5.

FIGS. 1 through 4 illustrate a preferred form of the tomato harvester of this invention for use in Florida farms where the tomato plants are grown in broken-up coral rock, according to the method described above as part of the background of the invention. Here a pickup 10 of a harvester otherwise like those previously patented by the University of California is shown having a pickup frame 11. This frame is pivotally connected to the harvester's main frame 12 (see FIG. 6) and is connected by suitable hydraulic apparatus 13 so that it can be raised and lowered as desired. Near the front end and on each side of the pickup frame 11 is an upwardly extending support arm 14 (FIG. 1) to which an assist frame 15 is connected by a pivot pin 16. Above that, the assist frame 15 is also connected to the pickup frame 11 by hydraulic apparatus comprising a cylinder 17 pivotally connected to the frame 11, with a piston (not shown) inside the cylinder joined by a connecting rod 18 to the assist frame 15. This makes it possible to raise and lower the assist frame 15 relative to the pickup frame 11.

Figure 1:
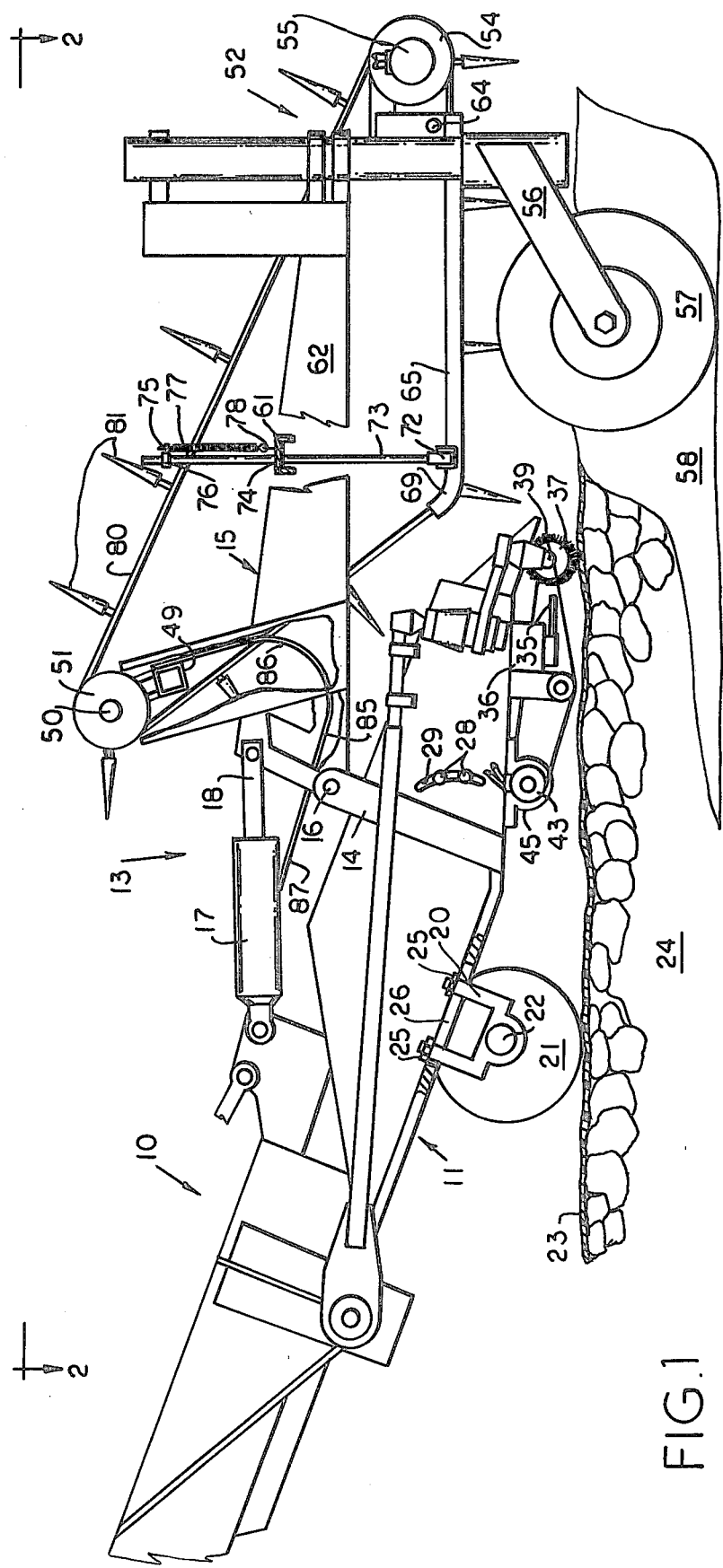
FIG. 1 is a view in side elevation of the pickup portion of a harvester embodying the principles of the invention and shown in use on a plastic-covered bed of broken rock in a Florida-type field with furrows on each side of the bed.
Figure 2:
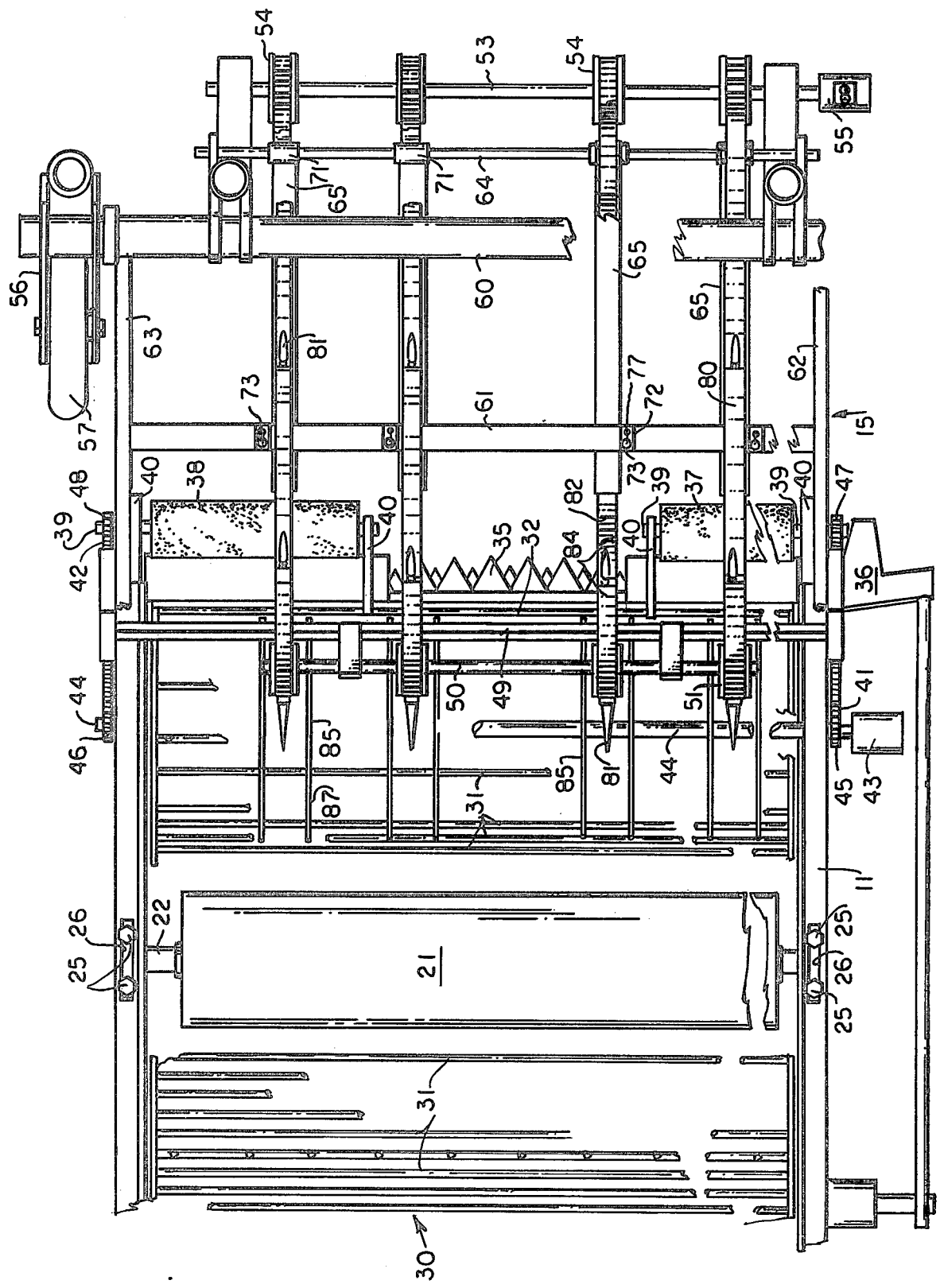
FIG. 2 is a plan view of the harvesting apparatus of FIG. 1 taken along the line 2—2 in FIG. 1, with parts broken to conserve space and some parts broken away to disclose other parts.

The pickup frame 11 has a pair of journal blocks 20 for rotatably supporting a roller 21 mounted on stub shafts 22. The roller 21 is located about midway along the bottom of the frame 11. This roller 21 determines the height above ground of the sickle 35 and the brushes 37 and 38, as can be seen by FIG. 1. It is used to hold down a plastic sheet 23 on top of a rock bed 24, as shown in FIG. 1 and therefore rolls on top of the sheet 23 over substantially the full width of the bed (see FIG. 2). By helping to prevent movement of the sheet 23 and distortion thereof, the roller 21 enables harvesting to be much more readily and efficiently accomplished. The journal blocks 20 are secured to the pickup frame 11 with aid of bolts 25, and lengthwise slots 26 in the frame 11 enable adjustment of the fore-and-aft position of the blocks 20 and therefore of the roller 21.

The pickup frame 11 supports a pickup conveyor 30 (see FIG. 2) comprising a series of rods 31 extending transversely across the pickup frame 11 and linked by a continuous chain type of structure as shown in U.S. Pat. No. 3,986,561. This conveyor 30, as is conventional with this particular type of tomato harvester, has a small pickup angle at its forward end 32 where it approaches the ground level, though it is normally held above ground level. The angle of inclination is relatively flat, preferably about 30°. This angle can be adjusted by means of bolts 28 that secure the frame for the conveyor 30 to the pickup frame 11, the bolts being adjustable along on arcuate slot 29. The conveyor 30 is succeeded in another part of the apparatus (see FIG. 6) by a more steeply inclined elevator 33 which carries the tomato plants up to the shaker or separation zone 34, where the tomatoes are shaken off the vines as in U.S. Pat. No. 3,986,561. At intervals the rods 31 are provided with flights to help retain tomatoes which fall off the vines and tend to roll down, and also to retain the plants themselves. This flighted conveyor may be used, as in U.S. Pat. No. 3,986,561 with apparatus which salvages the loose tomatoes, gets rid of clods or rocks if they are present, and also transfers the plants to the steeper elevator 33. So far as the present invention is concerned, however, the elevator 33 could lead directly to a bin and the tomato plants could be processed elsewhere, or other separation methods could be employed.

At the front end of the pickup frame 11 and just below and very slightly forward of the front end 32 of the conveyor 30 (see FIG. 3) is mounted a suitable stem severing apparatus such as a power sickle 35 in which one or both blades are moved laterally back and forth, usually being powered by a hydraulic motor system 36, although other types of power may be used. In this particular instance, the sickle 35 is a short one and operates at only about the center third or quarter of the machine. On both sides of it and slightly in front of it are rotary cylindrical brushes 37 and 38 (see FIG. 2), each on a shaft 39, which are also power driven by suitable hydraulic apparatus to rotate in such a manner as to help to straighten up the sprawled tomato vine. These brushes 37 and 38 are important because the tomato vines tend to sprawl, sometimes all the way into the furrows. These rotary cylindrical brushes 37 and 38 also engage the plastic and help to hold the plastic down without causing wrinkling, since they move in the counterclockwise direction, as viewed in FIG. 1.

Each of the brushes 37 and 38 is mounted on a pair of arms 40 (FIG. 2) and is driven by respective chains 41 and 42. The chains 41 and 42 are both mounted in a loop on sprocket wheels and idlers, and a hydraulic motor 43 rotates a transverse shaft 44 to drive sprocket wheels 45 and 46 that in turn drive the chains 41 and 42 respectively, which transmit the drive to the respective brush shafts through sprocket wheels 47 and 48 on shafts 39.

The apparatus as described so far would not obtain uniform severance of the vines and would not load them without harm onto the upwardly moving conveyor 30. For this, the assist apparatus is important.

The assist frame 15 (FIGS. 1-4) comprises a rear rigid member 49, an upper transverse rear shaft 50 carrying a series of idler sprocket wheels 51, and a front end portion 52 carrying a drive shaft 53 with drive sprocket wheels 54, driven by a hydraulic motor 55. The front end portion 52 provides wheel supports 56, so that a wheel 57 is supported in each furrow 58 of the side of the bed. The assist frame 15 also includes a front rigid transverse member 60 and an intermediate rigid transverse member 61 located approximately centrally in between the front end and the rear member. There are also side frame members 62 and 63 that support the rear shaft 50, the intermediate member 61, the front end 52, and a stationary shaft 64.

A series of generally horizontal lengthwise extending guideways 65 are provided, each of which is pivotally secured to the stationary shaft 64 at its front end. The guideways 65 are inverted channels (see FIG. 5) with an upper wall 66 and side flanges 67 and 68, and there is a guide rail 69 welded to the lower surface of the wall 66. Although mostly horizontal, each guideway 65 preferably has a rear curved portion 70 which extends through an angle of about 130° to define a steeply upwardly inclined guide. Each guideway 65 is separated from the others and is individually pivoted to the shaft 64, as by a bracket or collar 71. Each guideway 65 also has secured to it a bracket 72 to which a vertically extending rod 73 is pivotally attached. Each rod 73 extends up through an opening 74 through the intermediate transverse member 61 and goes well above it. Near the upper end of each rod 73 is attached an adjustable collar 75 to a bracket 76 which is secured to one end of a spring 77. The lower end of the spring 77 is attached to a bracket 78 on the transverse frame member 61. The collar 75 governs the tension on the spring 77, which is normally nearly slack with its coils closed as in FIGS. 1 and 3. Tomato plants can lift upwardly the rear end of the guideway 65 as in FIG. 4, but such lifting results in stretching the spring 77, and this stretching tends to cause the guideway 65 to return it to its normal, generally parallel position as soon as the upward force is removed.

In each guideway 65 rides an assist means 80, preferably an endless chain, which extends in a loop going around a drive sprocket wheel 54 at the front and an idler sprocket wheel 51 at the rear.

Each chain carries a spaced series of flexible, preferably rubber, projections 81, each about 8 inches long, preferably tapered. These extend downwardly from the horizontal path imposed by the guideways 65, and then are moved to an angular position (see FIGS. 1 and 3) as the chain 80 leaves the guideway 65. Since the rear terminal portion 70 of the guideway 65 extends upwardly and rearwardly the chain 80 follows the path and from there goes up to the sprocket wheels 51. Thus there is a horizontal path 82 followed by a steeply inclined path 83 (FIGS. 3 and 4) which sharply diverges from the gently inclined rearward slope of the pickup conveyor 30, and there is an upper return path 84.

The guideways 65, it will be noticed, are completely in front of the pickup conveyor 30, and the upward turn of the portion 70 is in front of the pickup conveyor 30, the sickle 35, and the brushes 37 and 38 (see FIG. 3). The rubber fingers 81 penetrate into tomato plants and the chains 80 are moved faster than ground speed by about 10 to 20%. This causes a pull on the plant, and when the projections 81 reach their turning point and start to move upwardly and to diverge vertically from the pickup conveyor 30, they tend to lift the plant and also to stretch its stem, so that the plant is pulled up and the bared stem is exposed to the sickle 35 at the time when the brushes 37 and 38 have also helped to straighten the plant. This means that the stem is placed in tension and is therefore cut easily. Thus, every plant is cut, as distinct from the condition in which there is no lifting at all, so that the sickle tends to ride over the stem and plant. This stretching also means that when the plant is cut, it tends to be lifted up rather than allowed to fall down, because the projecting fingers 81 are then moving in a more nearly horizontal direction.

To prevent the plants from simply being carried over the top of the assist device, a series of stripping tines 80 is provided; typically, there are two tines 85 two for each chain 80. The tines 85 are secured to the assist frame 15 and extend in downward portion 86 at a slightly forward angle, and then curve into a rear portion 87 which extends back past the chain 80 and is approximately parallel to the conveyor 30. Being located close to the chains 80 and on each side of each chain 80, the tines 85 act to strip the plant from the chains 80 at a location where the plants are well over the pickup conveyor 30, and therefore the plants fall into one or other flights of the pickup conveyor 30 and are carried away in the desired manner, the rear portions 82 of the tines helping to hold the plants down on the conveyor 30. The rubber fingers 81 pass between the stripping tines 85 and then go over the top, arriving at the upper shaft 50 substantially clean. Any loose material simply falls off.

Thus in the device of FIGS. 1 through 4, the action insures severing each plant, holding down the plastic, and gentle lifting and depositing of the plant on the pickup.

Figure 7:
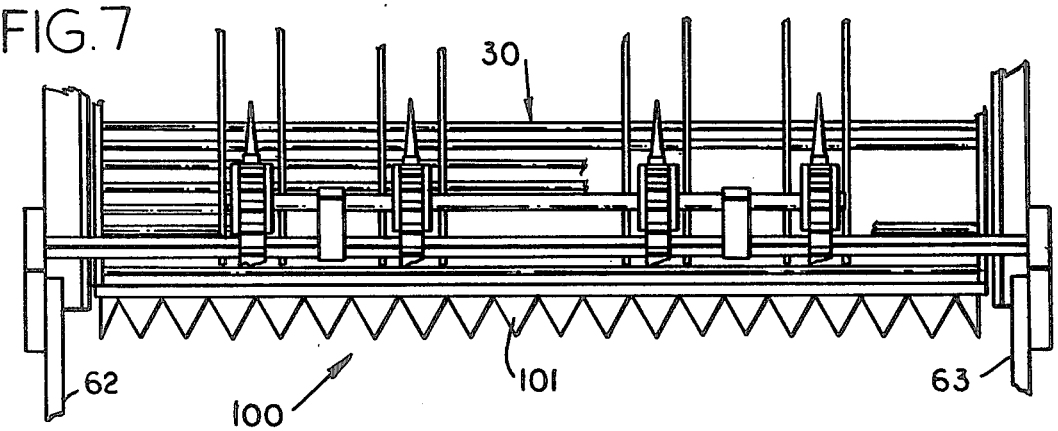
FIG. 7 is a fragmentary view of a portion of the pickup of a modified form of harvester embodying the principles of the invention, in which a sickle blade extends over the full width of the harvester pickup.

A device for use in normal fields (FIG. 7)

FIG. 7 illustrates the front end of a modified form of pickup device 100, the only part that differs when the device is made to be used in a more normal field. Here, the pickup device 100 has no roller and no rotary brushes. A sickle 101 extends all the way across the front of the pickup conveyor 30, so that a plurality of rows of tomato plants may be grown on each raised bed. There need be no furrows, but they are generally provided and are used in conjunction with the guide wheels 57. Of course, on the previous apparatus it is possible to use more than one sickle with brushes in between if there are more plants, but the conventional practice in that kind of growing situation is to grow only one row of tomato plants per bed and to have that row at or near the center of the bed.

In the form of the invention illustrated by FIG. 7, an advantage over prior harvesting is that much less dirt is picked up. The overhead assist (which is as in FIGS. 1-4) helps to lift the plant up, and the stem is cut at or slightly above ground level instead of below ground level, as has been normal practice. The assist device lifts the entire plant up and deposits it in the same way as in the device of FIGS. 1-4 upon the conveyor 30, obtaining a similar type of stretching action. Since the crop can be harvested in such a manner that there is not a substantial, amount of separated fruit lying on the ground, this is a very good way of keeping the harvested fruit clean. Therefore, this system is quite usable in fields of canning tomatoes as well as market tomatoes.

Figure 8:
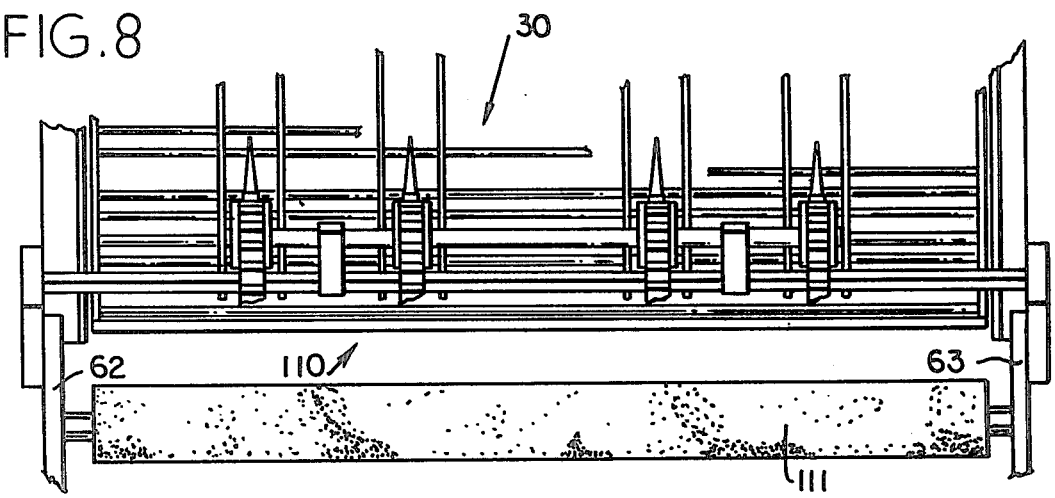
FIG. 8 is a fragmentary view of another modified form of harvester embodying the principles of the invention, in which there is no severing device at all on the pickup.

A device for use with pre-cutting (FIG. 8)

In FIG. 8 is shown a portion of a pickup device 110 in which there is no sickle or cutting means whatever; otherwise the device is like that of FIG. 7 except that a brush 111 extends across the full width of the machine. For use with that device a simple blade cutter is attached to a high frame tractor which goes through the field two or three hours before the harvesting machine does. However, the plants can be severed by hand if that be desired, using cutting apparatus at the ends of long handles or in other ways. As has been mentioned before, pre-cutting causes the fruit skin to harden somewhat, and the stems become more brittle at the point of attachment to the fruit, so that they break off there rather than further up the stem where the broken stems might cause damage to the fruit. Here again, with the vine stems being pre-cut, the lifting of the vines onto the machine is a very good system of insuring clean and efficient harvest. The brush 111 is used in Florida rock-field culture to help straighten and lift the sprawling plants. It may be used elsewhere, too, but in many fields the brush 111 can be omitted.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A tomato harvester pickup, including in combination:
   a pickup frame,
   a pickup conveyor supported by said pickup frame and having a relatively flat initial pickup angle at its forward end,
   an assist frame secured to said pickup frame spaced from said forward end and having a front end and an upper rear end,
   a plurality of endless overhead assist means supported by said front and rear ends for movement in a loop in a continuous path extending generally horizontally rearwardly from said front end forward of and higher than said forward end of said pickup conveyor, then up steeply in an upwardly and rearwardly inclined portion beginning slightly forward of said forward end of said pickup conveyor and extending to the rear of said forward end well above said pickup conveyor, with increasing vertical spacing from said pickup conveyor to said rear end, and then downwardly and forwardly to said front end,
   power means for moving each said assist means around its loop,
   a series of long, individual, spike-like projections extending out substantially normally from each said assist means so that, along the generally horizontal portion of its path, the projections extend downwardly so that they can enter into tomato vines and engage them, and then carry the vines upwardly steeply along the steeply inclined portion of the loop, and
   a series of vine-releasing means secured to the rear end of said assist frame and each extending downwardly from its point of securement and then curved to extend rearwardly from and beyond said assist frame and generally parallel to said pickup conveyor for freeing said vines from said assist means when said vines are over said pickup conveyor, thereby insuring transfer of the vines fully to said pickup conveyor.

2. The pickup of claim 1 having vine-severing means supported by said pickup frame in front of and lower than said forward end and to the rear of the rear end of the horizontal portion of the path of said assist means, said assist means stretching the tomato vine to improve performance of said vine severing means.

3. The pickup of claim 2 wherein said vine-severing means comprises powered reciprocating sickle means.

4. The pickup of claim 3 wherein said sickle lies between and slightly to the rear of a pair of non-cutting means on said pickup frame for lifting the tomato vines from below.

5. The pickup of claim 4 wherein each said means for lifting comprises a power-driven horizontal cylindrical rotary brush.

6. The pickup of claim 1 having a ground-engaging roller supported rotatably by and beneath said pickup frame and spaced away from the forward end of said conveyor.

7. The pickup of claim 6 having means for adjusting the fore-and-aft position of said roller along said pickup frame.

8. The pickup of claim 1 having a pair of ground-engaging wheels rotatably supported by the front end of said assist frame at each side thereof, for running in furrows at each side of a planted bed, while the assist means overlie the planted bed.

9. A tomato harvester pickup, including in combination:
   a pickup frame,
   a pickup conveyor supported by said pickup frame and having a relatively flat initial pickup angle at its forward end,
   an assist frame pivotally secured to said pickup frame above and spaced from said forward end and having a front end and an upper rear end,
   a plurality of forward generally horizontal guideways pivotally supported by said front end and spaced forward of and above said forward end of said pickup conveyor,
   a corresponding plurality of endless overhead assist means supported by said front and rear ends and each passing along the lower surface of a said guideway for movement in a loop in a continuous path extending horizontally rearwardly along said guideway, then up steeply with increasing spacing from said pickup conveyor to said rear end, and then downwardly and forwardly to said front end.
   power means for moving each said assist means around its loop,
   a series of long, individual, spike-like, flexible projections extending out substantially normally from each said assist means so that when said assist means moves along its guideway, some projections extend down into tomato vines and engage them, and then carry the vines upwardly steeply along the steeply inclined portion of the loop, and
   a series of vine-releasing means secured to the rear end of said assist frame and each extending downwardly from its point of securement and then curved to extend rearwardly from and beyond said assist frame and generally parallel to said pickup conveyor, for freeing said vines from said assist means when said vines lie over said pickup conveyor, thereby insuring transfer of the vines fully to said pickup conveyor.

10. The pickup of claim 9 having a pair of gauge wheels supported by said assist frame for riding in two furrows on each side of a raised bed of a tomato field.

11. The pickup of claim 9 in which each said guideway has a steeply upwardly and rearwardly inclined rear portion beginning slightly forward of said forward end of said pickup conveyor and extending to a point above said pickup conveyor.

12. The pickup of claim 9 or 10 having a separate spring-loaded means for each said guideway connected to said guideway and to an intermediate transverse portion of said assist frame, so that each said guideway can be swung upwardly about its pivot by a tomato plant but only against the restoring force of a spring urging it back to a portion substantially parallel to the ground.

13. The pickup of claim 9 having cutting means for severing the stem of the tomato vines and wherein said power means comprises means for moving said assist means around its path at a speed ten to twenty percent greater than the ground speed of said harvester, helping to stretch the plant upwardly and bare the stem so that it is cut more easily.

14. The pickup of claim 9 wherein said vine-releasing means are tines secured in pairs to said rear end of said assist frame and extending downwardly and then rearwardly on each side of each said assist means, said tines then extending over and parallel to said conveyor.

15. The pickup of claim 9 having a sickle-type stem-cutter supported transversely by said pickup frame at and below said forward end, said assist means serving to stretch the tomato vines upwardly in assistance to the severing of the stem by said stem-cutter.

16. The pickup of claim 15 having a pair of power-driven rotary cylindrical brushes supported transversely by said pickup frame, one on each side of and forward of said stem-cutter for helping to lift the tomato vines.

17. A tomato harvester pickup, including in combination:
 a pickup frame,
 a pickup conveyor supported by said pickup frame and having a relatively flat initial pickup angle at its forward end,
 an assist frame pivotally secured to said pickup frame above and spaced from said forward end and having a front end and an upper rear end,
 a plurality of foward generally horizontal downwardly facing channels pivotally supported by said front end and spaced forward of and above said forward end of said pickup conveyor, each said channel having a short steeply upwardly and rearwardly inclined rear portion beginning slightly forward of said forward end of said pickup conveyor and extending to a point above said pickup conveyor,
 a corresponding plurality of endless overhead assist chains supported by said front and rear ends and each moving along the lower surface of a said channel for movement in a loop in a continuous path extending horizontally rearwardly along said channel, then up steeply with increasing spacing from said pickup conveyor to said rear end, and then downwardly and forwardly to said front end,
 power means for moving each said assist chain around its loop, at a speed about ten to twenty percent greater than ground speed,
 a series of long, individual, spike-like, flexible projections extending out substantially normally from each said assist chain so that when said assist chain moves along its channel, some projections extend down into tomato vines and engage them, and then carry the vines upwardly steeply along the steeply inclined portion of the loop, and
 a series of vine-releasing tines secured in pairs to the rear end of said assist frame and each extending downwardly from its point of securement and then curved to extend rearwardly close to and on each side of a said assist chain and beyond said assist frame and generally parallel to said pickup conveyor, for freeing said vines from said assist chain when said vines lie over said pickup conveyor, thereby insuring transfer of the vines fully to said pickup conveyor, said tines extending rearwardly from said chains and substantially parallel to said conveyor to help hold the vines down on said conveyor.

18. The pickup of claim 17 having a pair of gauge wheels supported by said assist frame at its front end for riding in two furrows on each side of a raised bed of a tomato field.

19. The pickup of either of claim 17 or 18 having separate spring-loaded means for each said channel connected to said channel and to an intermediate transverse portion of said assist frame so that the rear portion of said channel yields to upward pressure of a said tomato plant and the channel swings upwardly about its pivot while increasing spring pressure tending to restore it to a position substantially parallel to the ground.

20. The pickup of claim 17 having a stem-cutter supported transversely by said pickup frame at and below said forward end, said assist means acting to stretch said vine upwardly so that the stem-cutter can cut generally straight across the stem.

21. The pickup of claim 20 having a pair of plant lifting means, one on each side of said stem cutter, supported by said pickup frame.

22. The pickup of claim 21 wherein said plant lifting means comprises a pair of power-driven rotary cylindrical brushes supported transversely by said pickup frame, one on each side of and forward of said stem-cutter for keeping the tomato vines approximately centered on their stems.

23. A tomato harvester pickup for harvesting tomatoes grown on a raised bed between a pair of furrows, including in combination:
 a harvester main frame,
 a pickup frame pivotally supported at the front end of said main frame,
 a pickup conveyor supported by said pickup frame and having a relatively flat initial pickup angle at its forward end,
 a sickle-type stem-cutter supported transversely by said pickup frame at and below said forward end,
 a pair of power-driven rotary cylindrical brushes supported transversely by said pickup frame, one on each side of and forward of said stem-cutter for helping to lift the tomato vines,
 a ground-engaging roller supported rotatably by and beneath said pickup frame transversely of said frame and spaced rearwardly from said forward end, an assist frame pivotably supported by said pickup frame forward and above and spaced from said forward end and having a rear transverse portion, a pair of side portions extending forwardly therefrom, and secured to an intermediate frame portion, and a front end frame portion with a wheel-support frame portion, a pair of gauge wheels supported by said wheel-support frame portion for riding in the two furrows on each side of the raised bed, a plurality of lower horizontal guideways pivoted to said front end extending to the rear thereof and spaced forward of and at a higher level than said forward end of said pickup conveyor, each said guideway having a steeply upwardly and rearwardly inclined rear portion beginning slightly forward of said forward end of said pickup conveyor, separate spring-loaded means for each said guideway connected to said guideway and to said intermediate frame portion for yielding to upward movement of the rear portion of said guideway under spring forced urging the rear portion back to a position substantially parallel to the ground, a plurality of endless overhead assist means supported by said front and rear portions of said assist frame and by a lower surface of said guideways, for movement in a loop around said front and rear portions and along said guideways in a continuous path comprising a lower horizontal path portion, a steeply upwardly and rearwardly inclined rear portion extending over and above said pickup conveyor with increasing spacing therebetween to an upper end, and a downwardly and forwardly inclined return path extending to the front end portion of said assist frame, power means for driving said assist means around its path, at a speed greater than the ground speed of said harvester, a series of projections extending out substantially normally from each said assist means for projecting down into tomato vines and engaging them when said assist means is moving along said horizontal path and thereafter lifting the vines upwardly steeply along the steeply inclined rear path, whereby the stems of said vines are somewhat stretched up vertically and bared, with the brushes help, so that the stem cutter cuts them easily, and a series of vine-releasing tines secured in pairs to said rear end of said assist frame and extending downwardly and then rearwardly on each side of each said assist means for freeing said vines from said assist means after the stems have been cut and when said vines lie over said pickup conveyor, so that said pickup conveyor thereupon provides the sole support for the vines.

24. The pickup of claim 23 having means for adjusting the fore-and-aft position of said roller along said pickup frame.

25. The pickup of claim 23 wherein said power means move said assist means at a speed about ten to twenty percent greater than said ground speed.

26. The pickup of claim 23 wherein said assist means are chains and said guideways are downwardly facing channels.

27. The pickup of claim 23 wherein said tines extend rearwardly from said assist means and substantially parallel to said conveyor.

28. A tomato harvester pickup for harvesting tomatoes grown on a raised bed between a pair of furrows, including in combination:

a harvester main frame, a pickup frame pivotally supported at the front end of said main frame, a pickup conveyor supported by said pickup frame and having a relatively flat initial pickup angle at its forward end, a stem-cutter supported transversely by said pickup frame at and below said forward end, an assist frame pivotably supported by said pickup frame forward and above and spaced from said forward end and having a rear transverse portion, a pair of side portions extending forwardly therefrom, and secured to an intermediate frame portion, and a front end frame portion with a wheel-support frame portion, a pair of gauge wheels supported by said wheel-support frame portion for riding in the two furrows on each side of the raised bed, a plurality of lower horizontal guideways pivoted to said front end extending to the rear thereof and spaced forward of and at a higher level than said forward end of said pickup conveyor, each said guideway having a steeply upwardly and rearwardly inclined rear portion beginning slightly forward of said forward end of said pickup conveyor, separate spring-loaded means for each said guideway connected to said guideway and to said intermediate frame portion for yielding to upward movement of the rear portion of said guideway under spring pressure urging said rear portion back toward a position substantially parallel to the ground, a plurality of endless overhead assist means supported by said front and rear portions of said assist frame and by a lower surface of said guideways, for movement in a loop around said front and rear portions and along said guideways in a continuous path comprising a lower horizontal path portion, a steeply upwardly and rearwardly inclined rear path portion extending over and above said pickup conveyor with increasing spacing therebetween to an upper end, and a downwardly and forwardly inclined return path extending to the front end portion of said assist frame, power means for driving said assist means around its path, at a speed greater than the ground speed of said harvester, a series of long, individual, spike-like projections extending out substantially normally from each said assist means for projecting down into tomato vines and engaging them when said assist means is moving along said horizontal path and thereafter lifting the vines upwardly steeply along the steeply inclined rear path, whereby the stems of said vines are somewhat stretched up vertically so that the stem-cutter cuts them easily, and a series of vine-releasing tines secured in pairs to said rear end of said assist frame and each extending downwardly from its point of attachment and then curved to extend rearwardly on each side of each said assist means and beyond said assist frame and generally parallel to said pickup conveyor, for freeing said vines from said assist means after the stems have been cut and when said vines lie over said pickup conveyor, so that said pickup conveyor thereupon provides the sole support for the vines.

29. A tomato harvester pickup for harvesting tomatoes grown on a raised bed between a pair of furrows, the stems of the vines having been pre-cut, including in combination:

a harvester main frame, a pickup frame pivotally supported at the front end of said main frame, a pickup conveyor supported by said pickup frame and having a relatively flat initial pickup angle at its forward end, an assist frame pivotably supported by said pickup frame forward and above and spaced from said forward end and having a rear transverse portion, a pair of side portions extending forwardly therefrom, and secured to an intermediate frame portion, and a front end frame portion with a wheel-support frame portion, a pair of gauge wheels supported by said wheel-support frame portion for riding in the two furrows on each side of the raised bed, a plurality of lower horizontal guideways pivoted to said front end extending to the rear thereof and spaced forward of and at a higher level than said forward end of said pickup conveyor, each said guideway having a steeply upwardly and rearwardly inclined rear portion beginning slightly forward of said forward end of said pickup conveyor, separate spring-loaded means for each said guideway connected to said guideway and to said intermediate frame portion for yielding to upward movement of the rear portion of said guideway under spring pressure urging said rear portion toward a position substantially parallel to the ground, a plurality of endless overhead assist means supported by said front and rear portions of said assist frame and by a lower surface of said guideways, for movement in a loop around said front and rear portions and along said guideways in a continuous path comprising a lower horizontal path portion, a steeply upwardly and rearwardly inclined rear path portion extending over and above said pickup conveyor with increasing spacing therebetween to an upper end, and a downwardly and forwardly inclined return path extending to the front end portion of said assist frame, power means for driving said assist means around its path, at a speed greater than the ground speed of said harvester, a series of long, individual, spike-like projections extending out substantially normally from each said assist means for projecting down into the pre-cut tomato vines and engaging them when said assist means is moving along said horizontal path and thereafter lifting the vines upwardly steeply along the steeply inclined rear path, a series of vine-releasing tines secured in pairs to said rear end of said assist frame and each extending downwardly from its point of attachment and then curved to extend rearwardly on each side of each said assist means and beyond said assist means and generally parallel to said pickup conveyor, for freeing said vines from said assist when said vines lie over said pickup conveyor, so that said pickup conveyor thereupon provides the sole support for the vines.

30. The pickup of either claim 28 or 29 wherein said power means move said assist means at a speed about ten to twenty percent greater than said ground speed.

31. The pickup of either claim 28 or 29 wherein said assist means are chains and said guideways are downwardly facing channels.

32. The pickup of either claim 28 or 29 wherein said tines extend rearwardly from said assist means and substantially parallel to said conveyor.

33. The pickup of any of claims 1, 9, 17, 28 or 29 having a power-driven rotary cylindrical brush supported transversely by said pickup frame and extending all the way across the forward end of said pickup conveyor.

34. A method for growing and harvesting tomatoes in rocky terrain where the rock has been broken up, comprising the steps of growing tomato plants on raised beds, each bed lying between a pair of furrows and being covered by perforated plastic sheets with the tomato plants located at openings through the plastic sheets, when the tomato plants are approximately 8 inches tall, removing the lower side stems and leaves, allowing only a pair of upper laterals to remain, when the plants are ready for harvest, harvesting them over the plastic sheet by engaging each plant from above and in front of a severing apparatus, while lifting it up and stretching it, and then severing the stem above but near the upper surface of the plastic sheet, immediately following severing, moving a pickup conveyor below the lifted plant, and then transferring the plant to said pickup for sole support thereby, and then elevating the plant and transferring it to a separation station where the fruit is removed from the remainder of the plant.

35. The method of claim 34 including holding the plastic sheet down firmly while engaging and severing the stem and while moving the pickup conveyor beneath the severed plant.

36. A method for harvesting tomatoes grown in rocky terrain where the rock has been broken up, the tomato plants grown on raised beds, each bed lying between a pair of furrows and being covered by perforated plastic sheets with the tomato plants located at openings through the plastic sheets, the tomato plants when approximately 8 inches tall having had the lower side stems and leaves removed allowing only a pair of upper laterals to remain, including in combination harvesting over the plastic sheet by engaging each plant from above and in front of a severing apparatus, while lifting it up and stretching it, and then severing the stem above but near the upper surface of the plastic sheet, immediately following severing, moving a pickup conveyor below the lifted plant, and then transferring the plant to said pickup conveyor for sole support thereby, and then elevating the plant and transferring it to a separation station where the fruit is removed from the remainder of the plant.

37. The method of claim 36 including holding the plastic sheet down firmly while engaging the plant, severing it, and transferring it to said pickup conveyor.

38. The method of claim 37 wherein said separation is achieved by shaking the plant immediately after elevating it.

* * * * *